(12) United States Patent
Toriumi

(10) Patent No.: US 7,326,119 B2
(45) Date of Patent: Feb. 5, 2008

(54) BOOT FOR CONSTANT VELOCITY UNIVERSAL JOINT

(75) Inventor: Mayuki Toriumi, Aichi-ken (JP)

(73) Assignee: Toyoda Gosei Co., Ltd., Kariya (JP)

( * ) Notice: Subject to any disclaimer, the term of this patent is extended or adjusted under 35 U.S.C. 154(b) by 174 days.

(21) Appl. No.: 11/294,508

(22) Filed: Dec. 6, 2005

(65) Prior Publication Data
US 2006/0125194 A1   Jun. 15, 2006

(30) Foreign Application Priority Data
Dec. 10, 2004   (JP) .............................. 2004-357912

(51) Int. Cl.
*F16D 3/84*   (2006.01)
(52) U.S. Cl. ..................................... 464/175
(58) Field of Classification Search ........ 464/173–175; 277/634–637; 403/50, 51
See application file for complete search history.

(56) References Cited

U.S. PATENT DOCUMENTS

2002/0043772 A1   4/2002 Huchet et al.

FOREIGN PATENT DOCUMENTS

| EP | 0 504 004 | 3/1992 |
|---|---|---|
| EP | 0 702 173 | 3/1996 |
| JP | 2-71122 | 5/1990 |
| JP | 2-87131 | 7/1990 |
| JP | A-2005-035247 | 2/2005 |

*Primary Examiner*—Greg Binda
(74) *Attorney, Agent, or Firm*—Posz Law Group, PLC

(57) ABSTRACT

A boot for a constant velocity universal joint includes a minor-diameter cylinder, a major-diameter cylinder, and a bellows. The major-diameter cylinder includes a sealing protrusion rim, a plurality of flanges, and positioning protrusions. The sealing protrusion rim is formed on an inner peripheral surface of the major-diameter cylinder. The flanges are disposed at intervals in a peripheral direction of the major-diameter cylinder, and extend axially outward from an opposite end surface of the major-diameter cylinder. The positioning protrusions protrude from the flanges radially toward an inner peripheral side of the major-diameter cylinder, and are to be engaged with concavities formed in an outer peripheral surface of the mating member. The boot maintains the sealing ability high, and at the same time can reduce the resistance during its fitting around a mating member, and can furthermore produce a fitting completion feeling when the fitting is completed.

19 Claims, 3 Drawing Sheets

BOOT FOR CONSTANT VELOCITY UNIVERSAL JOINT

BACKGROUND OF THE INVENTION

1. Field of the Invention

The present invention relates to a boot which covers constant velocity universal joints, which are essential for joints for the drive shaft of front wheel drive vehicles, to inhibit water and dust from intruding into the joint part of constant velocity universal joints.

2. Description of the Related Art

The joint part of a constant velocity universal joint has been covered with a bellows-shaped boot, in which grease is sealed, conventionally. The boot inhibits water and dust from intruding into the joint part, thereby keeping the joint part rotating smoothly at large angles. Such a boot for a constant velocity universal joint comprises a major-diameter cylinder, a minor-diameter cylinder, and a substantially-truncated-cone-shaped bellows. The major-diameter cylinder is held to a joint outer race. The minor-diameter cylinder has a smaller diameter than that of the major-diameter cylinder, and is held to a shaft. The bellows connects the major-diameter cylinder with the minor-diameter cylinder integrally. In service, since the bellows deforms depending on the change of angles (i.e., joint angles) between the joint outer race and the shaft, it is possible to securely seal the joint part of the constant velocity universal joint with the boot even when the joint angles enlarge.

Such a boot for a constant velocity universal joint has been used to be formed of rubber. However, since rubber exhibits limitation in view of the durability, thermoplastic elastomer, which is good in terms of the weatherability, heat resistance and fatigue resistance, has been used recently. On the other hand, it is required to provide a boot for a constant velocity universal joint with a sealing function for inhibiting water and dust from intruding into the joint part reliably. However, the major-diameter cylinder of a boot has often been fitted around a mating member by means of irregularly-shaped fitting or noncircular fitting. Due to the circumstances, there has been a problem in that it is difficult to secure the sealing ability, because thermoplastic elastomer, the material for forming a boot, exhibits low elasticity so that it does not exhibit following ability as good as rubber. Moreover, blow molding is a convenient method for molding a boot for a constant velocity universal joint. However, since the surface of a mating member is formed as a noncircular shape generally, it is needed to mold a boot so as to conform to the noncircular shape. When manufacturing such a boot by blow molding, however, it is difficult to form the inner peripheral surface of the boot's major-diameter cylinder so as to enhance the sealing ability with respect to the mating member. Thus, from the manufacturing viewpoint as well, it is difficult to secure the sealing ability.

Hence, Japanese Unexamined Utility Model Publication (KOKAI) No. 2-87,131 discloses a boot for a constant velocity universal joint, boot which comprises a boot body formed of polyester-based thermoplastic elastomer, and an annular grommet made of soft rubber which is fitted into the boot body's major-diameter cylinder. The grommet can be manufactured with good accuracy by injection molding even when the grommet has thick-walled portions and thin-walled portions and has an inner peripheral surface formed as a noncircular shape, because the grommet can be molded independently of the boot body. Moreover, the boot body can be manufactured by blow molding, because it is not necessarily required to mold the boot body with such high configuration accuracy. In addition, a fastening force resulting from clamping is transmitted to the grommet by way of the boot body's major-diameter cylinder, and thereby the grommet deforms elastically to closely adhere to a mating member. As a result, the boot demonstrates the sealing ability. That is, the boot body can secure the durability of the boot, and the grommet can secure the sealing ability of the boot with respect to a mating member. Moreover, the boot can be manufactured inexpensively, because the boot body whose configuration is larger than that of the grommet can be manufactured by blow molding so that the man-hour requirement for manufacturing the boot is reduced.

Further, in recent years, since the performance of thermoplastic elastomer has improved, it is about to carry out manufacturing a boot for a constant velocity joint boot, boot which comprises a major-diameter cylinder with a grommet integrated, using an injection blow molding method, for instance, as proposed in Japanese Unexamined Patent Publication (KOKAI) No. 2003-276,944.

A boot for a constant velocity universal joint, boot which is provided with such irregularly-shaped cross-sectional portions on the inner peripheral side, is assembled with a mating member in the following manner: the grommet and major-diameter cylinder, or only the major-diameter cylinder is fitted around a mating member; and the major-diameter cylinder is fastened to the mating member by a clamp which is disposed around the outer periphery of the major-diameter cylinder. Therefore, when fitting the boot around the mating member, it is required to carry out positioning the boot for fitting the mating member into the boot. Accordingly, the positioning has been conventionally carried out in the following fashion: concavities are formed in the outer peripheral surface of the mating member, and at the same time positioning protrusions are formed correspondingly on the inner peripheral surface of the grommet or on the inner peripheral surface of the major-diameter cylinder; and the positioning protrusions are engaged with the concavities to position the boot with respect to the mating member.

However, since the major-diameter cylinder is relatively hard, the diametrically-enlarging deformation of the major-diameter cylinder might be restricted when the positioning protrusions slide on the outer peripheral surface of the mating member during the fitting of the boot around the mating member. Accordingly, there has been a problem in that the major-diameter cylinder might resist to the fitting of the boot around the mating member to degrade the operability. Moreover, even when the positioning protrusions engage with the concavities of the mating member during the fitting of the boot around the mating member, the deformation magnitude of the major-diameter cylinder is scant so that no fitting completion feeling might be obtained. Consequently, there has been a drawback that no checking might be made whether the boot is positioned with respect to the mating member.

Moreover, ring-shaped sealing protrusion rims are formed on the inner peripheral surface of the grommet or major-diameter cylinder, and are disposed within a fastening allowance of the clamp. Moreover, the positioning protrusions have often been provided with a sealing protrusion rim at the leading end. In this instance, however, since the sealing protrusion rims slide on the mating member when fitting the boot around the mating member, the sealing protrusion rims might be worn off or damaged. If such is the case, the boot might suffer from a drawback in view of the sealing ability.

Hence, Japanese Unexamined Utility Model Publication (KOKAI) No. 2-71,122 discloses a boot for a constant velocity universal joint, boot which comprises slits extending axially from an opposite end surface of a major-diameter cylinder, and positioning protrusions formed so as to avoid the slits. With such an arrangement, since the slits make it easy to diametrically enlarge the major-diameter cylinder, it is possible to reduce the resistance during the fitting of the boot around a mating member. However, it is less likely to obtain a fitting completion feeling when the positioning protrusions engage with the mating member's concavities. Moreover, when considering employing such a construction for a boot for a constant velocity universal joint, boot which comprises a boot body and a grommet, it is not recommendable to form the slits in the grommet or major-diameter cylinder from the viewpoint of the sealing ability, in addition to the problem of the poor fitting completion feeling. Besides, there arises a problem in that the man-hour requirements are enormous for manufacturing such a boot.

SUMMARY OF THE INVENTION

The present invention has been developed in view of the aforementioned circumstances. It is therefore an object of the present invention to provide a boot for a constant velocity universal joint, boot which can maintain the sealing ability high and at the same time can reduce the resistance during its fitting around a mating member, and additionally which can furthermore produce a fitting completion feeling when the fitting is completed.

A boot for a constant velocity universal joint according to an aspect of the present invention can solve the aforementioned problems, and comprises:

a minor-diameter cylinder to be held to a shaft;

a major-diameter cylinder separated away from the minor-diameter cylinder, disposed coaxially with the minor-diameter cylinder, and having a larger diameter than that of the minor-diameter cylinder and a noncircular inner peripheral cross-section, the major-diameter cylinder to be fastened to a mating member by diametrically reducing a fastening member inward around an outer peripheral surface of the major-diameter cylinder; and a bellows connecting the minor-diameter cylinder with the major-diameter cylinder integrally, and formed as a truncated cone shape substantially;

wherein the major-diameter cylinder comprises:

a sealing protrusion rim formed on an inner peripheral surface of the major-diameter cylinder;

a plurality of flanges disposed at intervals in a peripheral direction of the major-diameter cylinder, and extending axially outward from an opposite end surface of the major-diameter cylinder; and a positioning protrusion protruding from the flanges radially toward an inner peripheral side of the major-diameter cylinder, and to be engaged with a concavity formed in an outer peripheral surface of the mating member.

Moreover, a boot for a constant velocity universal joint according to another aspect of the present invention can solve the aforementioned problems as well, and comprises:

a boot body comprising:

a minor-diameter cylinder to be held to a shaft;

a major-diameter cylinder separated away from the minor-diameter cylinder, disposed coaxially with the minor-diameter cylinder, and having a larger diameter than that of the minor-diameter cylinder; and a bellows connecting the minor-diameter cylinder with the major-diameter cylinder integrally, and formed as a truncated cone shape substantially; and an annular grommet formed of a softer material than that of the major-diameter cylinder, having an inner peripheral cross section formed as a noncircular shape and a sealing protrusion rim formed on an inner peripheral surface of the grommet, and to be fitted around a mating member after being fitted into the major-diameter cylinder of the boot body, the grommet and the major-diameter cylinder of the boot body to be fastened to the mating member by diametrically reducing a fastening member inward around an outer peripheral surface of the major-diameter cylinder of the boot body;

wherein the major-diameter cylinder of the boot body comprises:

a plurality of flanges disposed at intervals in a peripheral direction of the major-diameter cylinder, and extending axially outward from an opposite end surface of the major-diameter portion; and a positioning protrusion protruding from the flanges radially toward an inner peripheral side of the major-diameter cylinder, and to be engaged with a concavity formed in an outer peripheral surface of the mating member.

The positioning protrusions can desirably be disposed adjacent to the opposite end surface of the major-diameter cylinder from which the flanges extends.

In accordance with the present invention, the present boot for a constant velocity universal joint comprises a plurality of the flanges, which extend axially outward from an opposite end surface of the major-diameter cylinder, and the positioning protrusions which are formed on the flanges to protrude radially inward. Accordingly, the positioning protrusions are disposed outside a fastening allowance of the fastening member so that they do not affect the sealing ability of the major-diameter cylinder. Moreover, the flanges are formed in a cantilevered manner, and are disposed axially off or away from positions, which are demarcated by the noncircular inner peripheral cross-section of the major-diameter cylinder. Consequently, the flanges deform elastically in radial directions with ease, without being restricted by the major-diameter cylinder. Therefore, the present boot exerts reduced load during its fitting around the mating member. In addition, when the positioning protrusions reach positions at which the concavities of the mating member are disposed, the flanges restore their original shapes with large elastic reaction forces. As a result, the present boot produces a favorable fitting completion feeling, and enables an assembly operator to securely carry out the positioning.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
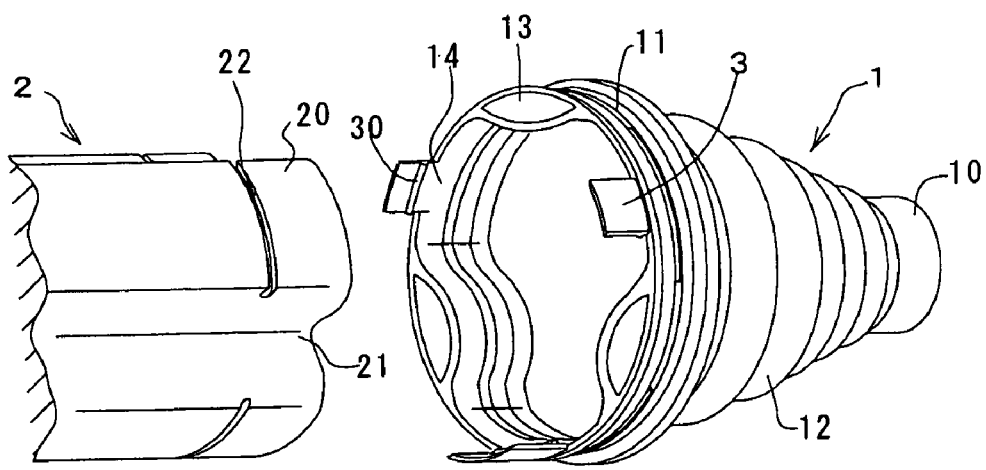
FIG. 1 is a perspective diagram for illustrating a boot of Example No. 1 according to the present invention for a constant velocity universal joint, along with a mating member.

Having generally described the present invention, a further understanding can be obtained by reference to the specific preferred embodiments which are provided herein for the purpose of illustration only and not intended to limit the scope of the appended claims.

The present invention relates to both types of a boot for a constant velocity universal joint, one which comprises a major-diameter cylinder with an integrated noncircular (or irregularly-shaped) inner peripheral cross-section, and another one which comprises a grommet and a boot body and in which a noncircular inner peripheral cross-section and a major-diameter cylinder are formed independently in the grommet and boot body, respectively. Both types agree with each other in that the major-diameter cylinder comprises: a plurality of flanges disposed at intervals in a peripheral direction of the major-diameter cylinder, and extending axially outward from an opposite end surface of the major-diameter cylinder; and a positioning protrusion protruding from the flanges radially toward an inner peripheral side of the major-diameter cylinder, and to be engaged with a concavity formed in an outer peripheral surface of a mating member.

The boot body comprises a minor-diameter cylinder, a major-diameter cylinder, and a bellows. The minor-diameter portion is to be held to a shaft. The major-diameter cylinder is separated away from the minor-diameter cylinder, is disposed coaxially with the minor-diameter cylinder, and has a larger diameter than that of the minor-diameter cylinder. The bellows connects the minor-diameter cylinder with the major-diameter cylinder integrally, and is formed as a truncated cone shape substantially. Moreover, in an outer peripheral surface of the major-diameter cylinder at least, there is formed a clamp groove which engages with a fastening member, such as a clamp. When a grommet is disposed independently of a boot body, it is preferable to form a second sealing protrusion rim, which engages with an outer peripheral surface of the grommet, in an inner peripheral surface of the major-diameter cylinder in order to secure a sealing ability between the boot body and grommet. When producing a boot body by blow molding, it is possible to form the second sealing protrusion rim by providing a blow-molding mold for forming the boot body with a convexed protrusion rim on a mold surface for forming the clamp groove.

The boot body can desirably be formed of thermoplastic elastomer, such as polyester-based thermoplastic elastomers and polyolefin-based thermoplastic elastomers. With such an arrangement, it is possible to make a boot of high durability. Moreover, the molding method is not limited in particular, however, it is preferable to produce the entire present boot by injection blow molding when the resulting boot is free of a grommet. On the other hand, it is preferable to produce a boot body of the present boot by blow molding when the resulting boot comprises a grommet. In the boot body produced by blow molding, it might be difficult to control an inner-peripheral surface configuration of the major-diameter cylinder, and the dimensional accuracy of the major-diameter cylinder's thickness might be low. However, in a boot for a constant velocity universal joint, boot which employs a grommet, those drawbacks do not matter at all.

The major-diameter cylinder or grommet is an annular component part whose inner peripheral cross-section is formed irregularly, and which has thick-walled portions and thin-walled portions corresponding to an outer peripheral configuration of a mating member. As described above, the major-diameter cylinder comprises a plurality of flanges, and positioning protrusions. The flanges are disposed at intervals in a peripheral direction of the major-diameter cylinder, and extend axially outward from an opposite end surface of the major-diameter cylinder. The positioning protrusions protrude from the flanges radially toward an inner peripheral side of the major-diameter cylinder, respectively, and are to be engaged with concavities formed in an outer peripheral surface of a mating member.

The major-diameter cylinder comprises a plurality of the flanges in view of securing the stability during the fitting of the present boot around a mating member. It is desirable to form the flanges symmetrically with respect to an axial center of the major-diameter cylinder. The peripheral positions at which the flanges are disposed are not limited in particular, however, it is easy to process the concavities of the mating member when the flanges are formed so as to extend from the thin-walled portions of the major-diameter cylinder. Moreover, more greatly the deformation load of flanges differs between prior to fastening with a clamp when the present boot is temporarily fitted around a mating member and after the fastening when the present boot is completely fastened to the mating member, the more likely it is to balance between the ease of fitting the mating member into the present boot and the difficulty of coming-off of the mating member from the present boot. Note that, however, it is possible to enlarge the difference between both deformation loads when the flanges are formed so as to extend from the thin-walled portions of the major-diameter cylinder.

In addition, when the positioning protrusions are disposed adjacent to the opposite end surface of the major-diameter cylinder from which the flanges extend, it is possible to furthermore enlarge the difference between the aforementioned deformation loads. As a result, not only it is possible to better balance between the ease of fitting the mating member into the present boot and the difficulty of coming-off of the mating member from the present boot, but also it is possible to furthermore improve the fitting completion feeling when the present boot is fitted around a mating member completely.

Note that the positioning protrusions can preferably have a cross-sectional configuration which comprises an inclined surface tapering from wide to narrow in the fitting-around direction of the major-diameter cylinder. With such an arrangement, it is possible to furthermore reduce the resistance when fitting the present boot around a mating member. Moreover, when the positioning protrusions further comprise a surface which is disposed oppositely to the inclined surface so as to uprise from an inner peripheral surface of the major-diameter cylinder at about an acute angle, it is possible to inhibit the positioning protrusions from coming off from the concavities of a mating member.

When the present boot comprises a major-diameter cylinder whose inner peripheral cross-section is formed irregularly, a sealing protrusion rim is formed on an inner peripheral surface of the major-diameter cylinder. On the other hand, when the present boot comprises a boot body and a grommet, a sealing protrusion rim is formed on an inner peripheral surface of the grommet. Moreover, the sealing protrusion rim is formed on an inner peripheral surface of either one of a boot body or a grommet around which a fastening member is disposed with a fastening allowance. The sealing protrusion rim can be formed in a quantity of one, however, can preferably be formed in a quantity of two or more. In addition, when the present boot comprises a boot body and a grommet, a second sealing protrusion rim, which contacts with an outer peripheral surface of the grommet to seal between the boot body and the grommet, can preferably be formed on an inner peripheral surface of a major-diameter cylinder of the boot body. Alternatively, a second sealing protrusion rim, which contacts with an inner peripheral surface of a major-diameter cylinder of the boot body to seal between the boot body and the grommet, can preferably be formed on an outer peripheral surface of the grommet.

The material for the grommet can be those which are softer than the boot body. For example, it is possible to use inexpensive polyolefin-based thermoplastic elastomers (e.g., thermoplastic olefin (TPO)) or rubber. Moreover, the molding method for the grommet is not limited in particular. It is possible to produce the grommet by compression molding or injection molding.

One of representative mating members is a joint outer race. Note that the concavities are formed in an outer peripheral surface of the joint outer race at positions, at which the positioning protrusions engage with the joint outer race, correspondingly.

EXAMPLES

Hereinafter, the present invention will be described in detail with reference to examples of the present invention.

Example No. 1

Figure 2:
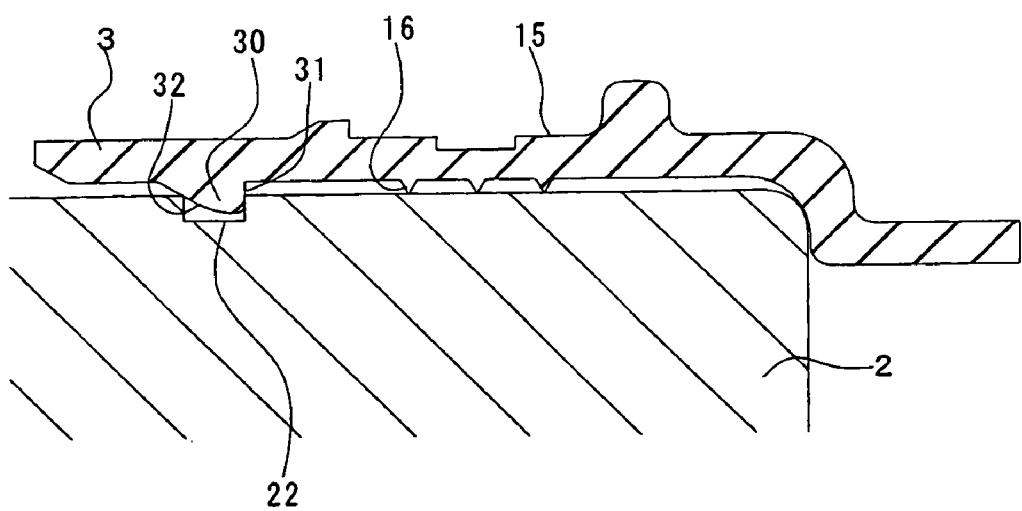
FIG. 2 is an enlarged cross-sectional diagram for illustrating a major part of the boot according to Example No. 1 of the present invention, boot which is fitted around the mating member.

FIG. 1 illustrates a boot of Example No. 1 according to the present invention for a constant velocity universal joint, along with a mating member, in a perspective diagram. FIG. 2 illustrates a major part of the boot, which is fitted around the mating member, in an enlarged cross-sectional diagram. The boot comprises a boot body 1, and is formed of relatively hard thermoplastic elastomer by injection blow molding.

The boot body 1 comprises a minor-diameter cylinder 10, a major-diameter cylinder 11, and a bellows 12. The major-diameter cylinder 11 has a larger diameter than that of the minor-diameter cylinder 10. The bellows 12 connects the minor-diameter cylinder 10 with the major-diameter cylinder 11 integrally, and is formed as a substantially truncated cone shape. The major-diameter cylinder 11 has an outer peripheral surface which is formed as a perfect circle, but has an inner peripheral surface which is formed irregularly so as to conform to an outer peripheral surface of a joint outer race 2. Moreover, the major-diameter cylinder 11 comprises thick-walled portions 13 and thin-walled portions 14. Note that the thick-walled portions 13 and thin-walled portions 14 are disposed alternately at three locations, respectively, in the peripheral direction of the major-diameter cylinder 11. In addition, the major-diameter cylinder 11 further comprises a relatively-wide-width flat clamp groove 15 formed in the outer peripheral surface, and three ring-shaped sealing protrusion rims 16 formed in the inner peripheral surface, as shown in FIG. 2. The sealing protrusion rims 16 contact elastically with the joint outer race 2, and extend parallelly to each other in the inner peripheral direction of the major-diameter cylinder 11 over the entire inner periphery.

The thin-walled portions 14 of the major-diameter cylinder 11 are provided with a plate-shaped flange 3, respectively. The flanges 3 extend axially from an opposite end surface of the major-diameter cylinder 11. The inner peripheral surface of the flanges 3 is provided with a positioning protrusion 30. The positioning protrusions 30 are formed adjacent to the opposite end surface of the major-diameter cylinder 11 from which the flanges 3 extend. Moreover, the positioning protrusions 30 comprise an upright surface 31, and an inclined surface 32, respectively, as illustrated in FIG. 2. The upright surfaces 31 protrude substantially vertically from the flanges 3. The inclined surfaces 32 extend from the free end of the upright surfaces 31, and taper from wide to narrow in the fitting-around direction of the major-diameter cylinder 32 to merge into the flanges 3. In addition, the positioning protrusions 30 extend in the inner peripheral direction of the flanges 3.

The joint outer race 2 comprises major-diameter portions 20, and minor-diameter portions 21. The major-diameter portions 20 have a larger diameter than that of the minor-diameter portions 21. Note that the major-diameter portions 20 and minor-diameter portions 21 are disposed alternately at three locations, respectively, in the peripheral direction of the joint outer race 2. Moreover, the major-diameter portions 20 are provided with a concavity 22, which is formed in the surface so as to extend in the peripheral direction, respectively. The major-diameter portions 20 conform to the shape of the thin-walled portions 14 of the major-diameter cylinder 11. The minor-diameter portions 21 conform to the shape of the thick-walled portions 13 of the major-diameter cylinder 11. In addition, the concavities 22 are formed as a squared-groove shape, which is capable of engaging with the positioning protrusions 30, respectively.

The boot according to Example No. 1 of the present invention for a constant velocity universal joint, boot which is arranged as described above, is assembled in the following manner. The joint outer race 2 is fitted into the major-diameter cylinder 11 of the boot body 1. In this instance, the leading-end-side portions of the flanges 3 beyond the positioning protrusions 30 function as the guide for fitting the joint outer race 2 into the major-diameter cylinder 11, because they contact with the joint outer race 2. Moreover, it is easy to fit the joint outer race 2 into the major-diameter cylinder 11, because the flanges 3 are formed to protrude from the thin-walled portions 14 of the major-diameter cylinder 11.

When the positioning protrusions 30 contact with the joint outer race 2, a diametrically-enlarging force acts onto the flanges 3 because the inside diameter of the positioning protrusions 30 is smaller than the outside diameter of the major-diameter portions 20 of the joint outer race 2. However, the resistance against the fitting of the major-diameter cylinder 11 of the boot body 1 around the joint outer race 2, resistance which results from the positioning protrusions 30, is reduced, because the flanges 3 are disposed in a cantilevered manner so that they can deform with ease. Moreover, not only the positioning protrusions 30 give a fitting completion feeling when the major-diameter cylinder 11 is fitted around the joint outer race 2 completely, but also they are less likely to come off from the joint outer race 2, because they are disposed adjacent to the opposite end surface of the major-diameter cylinder 11 from which the flanges 3 extends.

Moreover, when the fitting of the major-diameter cylinder 11 of the boot body 1 around the joint outer race 2 further develops and the positioning protrusions 30 arrive at the positions at which the concavities 22 of the joint outer race 2 are disposed, an elastic reaction force stored in the flanges 3 urges the positioning protrusions 30 to quickly go into the concavities 22. At the moment, the resistance against the fitting of the major-diameter cylinder 11 around the joint outer race 2 diminishes rapidly. Accordingly, an assembly operator can appreciate with a good fitting completion feeling that he or she has completed the positioning of the boot according to Example 1. Consequently, it is possible to preemptively prevent an assembly operator from fitting the boot body 1 around the joint outer race 2 falsely.

In addition, when the boot body 1 is fitted around the joint outer race 2, the fastening force resulting from clamping transmits to the three ring-shaped sealing protrusion rims 16 alone because the positioning protrusions 30 are positioned off or away from the clamp groove 15. Therefore, the boot body 1 demonstrates a high sealing ability.

Comparison Test

Figure 5:
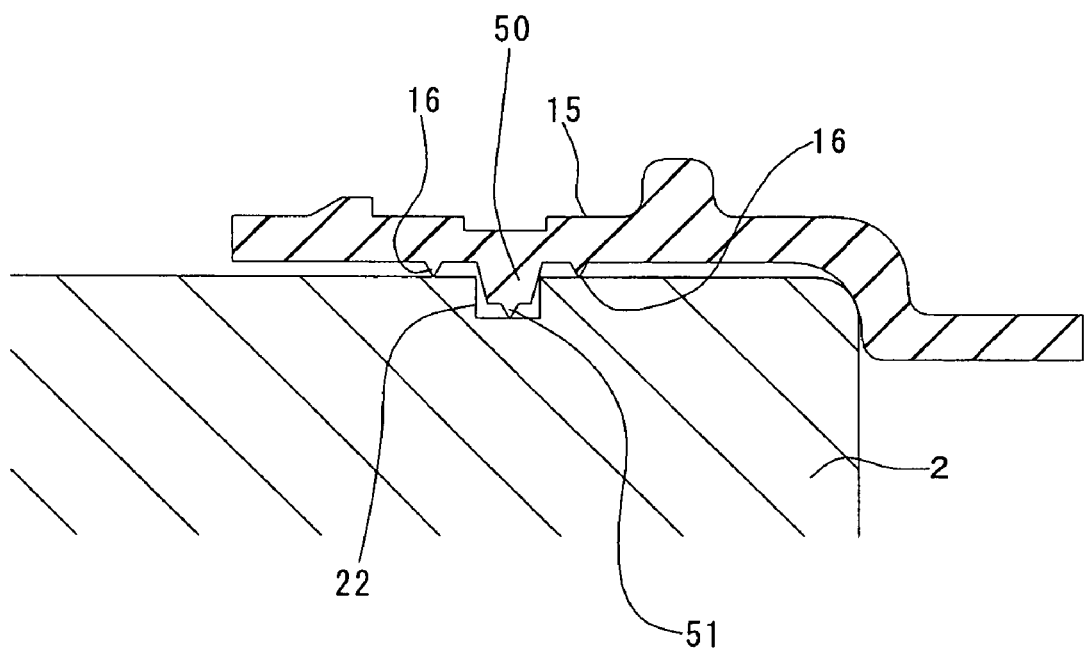
FIG. 5 is an enlarged cross-sectional diagram for illustrating a major part of a boot according to Comparative Example for a constant velocity universal joint, boot which is fitted around a mating member.

The loads for fitting the joint outer race 2 into boots for a constant velocity universal joint were measured, using the boot according to Example No. 1 of the present invention and a boot according Comparative Example (shown in FIG. 5) for a constant velocity universal joint. Note that the boot according to Comparative Example was manufactured in the same manner as the boot according to Example No. 1 except that no flanges 3 were formed, and that a positioning protrusion 50 is provided between two sealing protrusion rims 16 and a sealing protrusion rim 51 is provided at the leading end of the positioning protrusion 50 as well. Table 1 below sets forth the results.

TABLE 1

| | Load for Fitting (N) |
|---|---|
| Example No. 1 | 15 |
| Comp. Example | 50 |

Moreover, the boot according to Example No. 1 and the boot according to Comparative Example were deteriorated thermally by holding them at a high temperature for 500 hours after they were assembled with the joint outer race 2 and a shaft. Thereafter, they were rotated at a joint angle of 20 degrees with a revolution speed of 600 rpm under a low temperature. They were examined for how long it took for the sealed grease to leak out of them. As a result, both boots did no shown any leakage after 300 hours passed.

Thus, it is apparent that the boot according to Example No. 1 can reduce the load for fitting the joint outer race 2 thereinto while securing a sealing ability equivalent to that of the conventional ones. The advantage results from the arrangement that the flanges 3 are provided with the positioning protrusions 30, which are positioned off or away from the sealing protrusion rims 16.

Example No. 2

Figure 3:
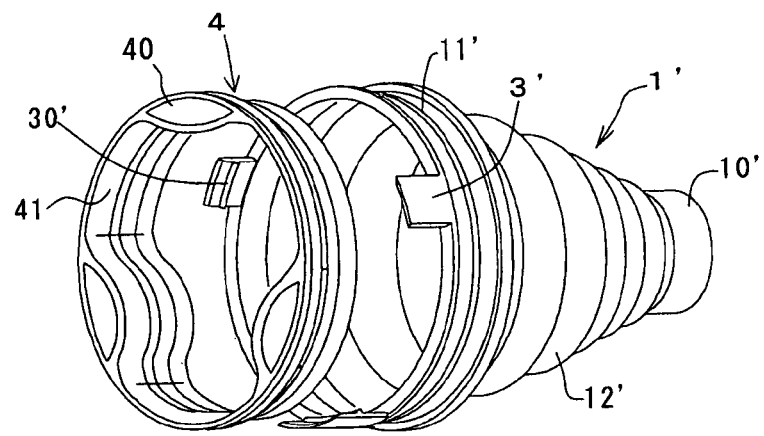
FIG. 3 is an exploded perspective diagram for illustrating a boot of Example No. 2 according to the present invention for a constant velocity universal joint.
Figure 4:
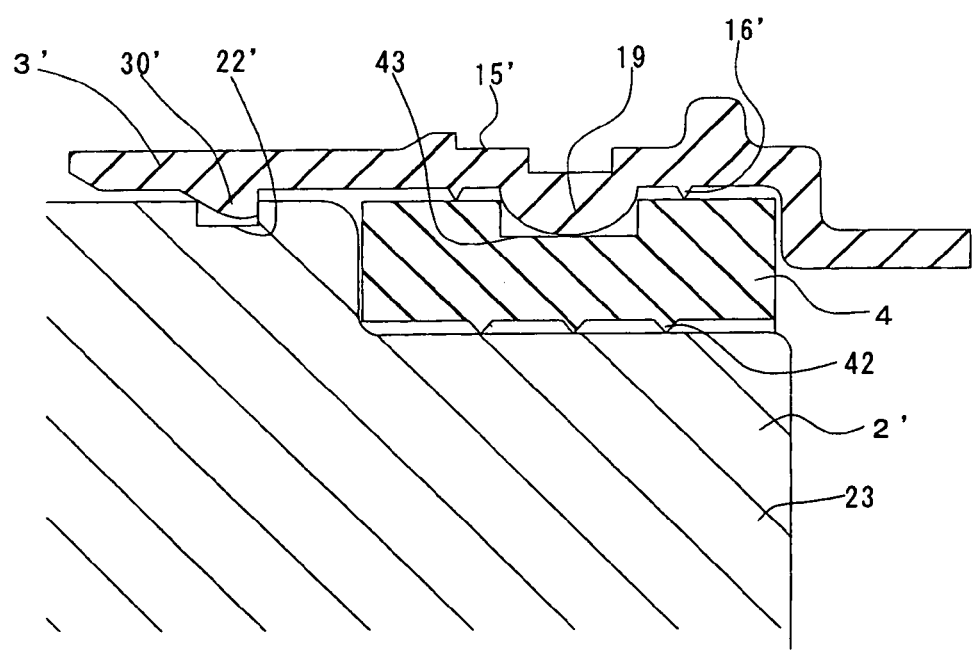
FIG. 4 is an enlarged cross-sectional diagram for illustrating a major part of the boot according to Example No. 2 of the present invention, boot which is fitted around a mating member.

FIGS. 3 and 4 illustrate a boot according to Example No. 2 of the present invention for a constant velocity universal joint. The boot according to Example No. 2 comprises a boot body 1', and an annular grommet 4. The grommet 4 is fitted into a major-diameter cylinder 11' of the boot body 1'. The boot body 1' is formed of relatively hard thermoplastic elastomer by injection blow molding. The grommet 4 is formed of rubber or relatively soft thermoplastic elastomer by injection molding.

The boot body 1' comprises a minor-diameter cylinder 10', a major-diameter cylinder 11', and a bellows 12'. The major-diameter cylinder 11' has a larger diameter than that of the minor-diameter cylinder 10'. The bellows 12' connects the minor-diameter cylinder 10' with the major-diameter cylinder 11' integrally, and is formed as a substantially truncated cone shape. The major-diameter cylinder 11' has an inner peripheral surface on which a ring-shaped protrusion rim 19 is formed, as shown in FIG. 4. The protrusion rim 19 goes around the inner peripheral surface of the major-diameter cylinder 11', and has a cross section which is formed as an arc shape. Moreover, the major-diameter cylinder 11' has an outer peripheral surface in which a relatively-wide-width flat clamp groove 15' is formed. In addition, two second sealing protrusion rims 16', which go around the inner peripheral surface of the major-diameter cylinder 11', are formed on both sides of the protrusion rim 19, respectively. Moreover, in the same manner as the major-diameter cylinder 11 of the boot according to Example No. 1, a plate-shaped flange 3', which extends axially from an opposite end surface of the major-diameter cylinder 11', is formed at three locations. In addition, a positioning protrusion 3 is formed on the inner peripheral surface of the flanges 30', respectively.

The grommet 4 is fitted into the major-diameter cylinder 11' of the boot body 1'. The thus inserted grommet 4 is fitted around a joint outer race 2', a mating member. The grommet 4 has an outer peripheral surface which is formed as a perfect circle, but has an inner peripheral surface which is formed irregularly so as to conform to an outer peripheral surface of the joint outer race 2', that is, thick-walled portions 40 and thin-walled portions 41 are disposed alternately in the peripheral direction of the grommet 4, as illustrated in FIG. 3.

The grommet 4 has an inner peripheral surface on which three ring-shaped sealing protrusion rims 42 are formed, as shown in FIG. 4. The sealing protrusion rims 42 contact elastically with the joint outer race 2', and extend parallelly to each other in the inner peripheral direction of the grommet 4 over the entire inner periphery. Moreover, the grommet 4 has an outer peripheral surface in which a ring groove 43 is formed. The ring groove 43 engages with the protrusion rim 19 of the major-diameter cylinder 11' In addition, the joint outer race 2' is provided with a diametrically-reduced portion 23 whose outside diameter conforms to an inside diameter of the grommet 4.

The boot according to Example No. 2 of the present invention for a constant velocity universal joint is positioned in the fitting operation around the joint outer race 2' in the following manner. First of all, the grommet 4 is fitted into the major-diameter cylinder 11' of the boot body 1'. Then, the protrusion rim 19 of the major-diameter cylinder 11' engages with the ring groove 43 of the grommet 4. At this moment, all of the three sealing protrusion rims 42 are positioned within the width of the clamp groove 15' of the major-diameter cylinder 11', but the flanges 3 protrude beyond the grommet 4, as shown in FIG. 4.

Under the sub-assembled state, the diametrically-reduced portion 23 of the joint outer race 2' is fitted into the grommet 4, and at the same time the flanges 3' are fitted around the major-diameter portions 20' of the joint outer race 2'. In this instance, the leading-end-side portions of the flanges 3' beyond the positioning protrusions 30' function as the guide for fitting the joint outer race 2' into the grommet 4, because they contact with the joint outer race 2'. Moreover, it is easy to fit the joint outer race 2' into the grommet 4, because the flanges 3' are formed to protrude from the thin-walled portions 14' of the major-diameter cylinder 11'.

When the positioning protrusions 30' contact with the joint outer race 2', a diametrically-enlarging force acts onto the flanges 3' because the inside diameter of the positioning protrusions 30' is smaller than the outside diameter of the major-diameter portions 20' of the joint outer race 2'. However, the resistance against the fitting of the major-diameter cylinder 11' of the boot body 1' around the joint outer race 2', resistance which results from the positioning protrusions 30', is reduced, because the flanges 3' are disposed in a cantilevered manner so that they can deform with ease. Moreover, not only the positioning protrusions 30' give a fitting completion feeling when the major-diameter cylinder 11' is fitted around the joint outer race 2' completely, but also they are less likely to come off from the joint outer race 2', because they are disposed adjacent to the opposite end surface of the major-diameter cylinder 11' from which the flanges 3' extend.

Moreover, when the fitting of the major-diameter cylinder 11' of the boot body 1' around the joint outer race 2' further develops and the positioning protrusions 30' arrive at the positions at which the concavities 22' of the joint outer race 2' are disposed, an elastic reaction force stored in the flanges 3' urges the positioning protrusions 30' to quickly go into the concavities 22. At the moment, the resistance against the fitting of the major-diameter cylinder 11' around the joint outer race 2' diminishes rapidly. Accordingly, an assembly operator can appreciate with a good fitting completion feeling that he or she has completed the positioning of the boot according to Example 2. Consequently, it is possible to preemptively prevent an assembly operator from fitting the boot body 1' around the joint outer race 2' falsely.

In addition, when the boot body 1' is fitted around the joint outer race 2', the fastening force resulting from clamping transmits to the three ring-shaped sealing protrusion rims 42 alone by way of the major-diameter cylinder 11' because the positioning protrusions 30' are positioned off or away from the clamp groove 15'. Therefore, the boot body 1' demonstrates a high sealing ability.

Having now fully described the present invention, it will be apparent to one of ordinary skill in the art that many changes and modifications can be made thereto without departing from the spirit or scope of the present invention as set forth herein including the appended claims.

What is claimed is:

1. A boot for a constant velocity joint, the boot comprising:
   a minor-diameter cylinder to be held to a shaft;
   a major-diameter cylinder separated away from the minor-diameter cylinder, disposed coaxially with the minor-diameter cylinder, and having a larger diameter than that of the minor-diameter cylinder and a noncircular inner peripheral cross-section, the major-diameter cylinder to be fastened to a mating member by diametrically reducing a fastening member inward around an outer peripheral surface of the major-diameter cylinder; and
   a bellows connecting the minor-diameter cylinder with the major-diameter cylinder integrally, and formed as a truncated cone shape substantially;

wherein the major-diameter cylinder comprises:
   a sealing protrusion rim formed on an inner peripheral surface of the major-diameter cylinder;
   a plurality of flanges disposed at intervals in a peripheral direction of the major-diameter cylinder, and extending axially outward from an opposite end surface of the major-diameter cylinder; and
   a positioning protrusion protruding from the flanges radially toward an inner peripheral side of the major-diameter cylinder, and to be engaged with a concavity formed in an outer peripheral surface of the mating member.

2. The boot set forth in claim 1, wherein:
   the positioning protrusions are disposed adjacent to the opposite end surface of the major-diameter cylinder from which the flanges extends.

3. The boot set forth in claim 1, wherein:
   the flanges are formed in a cantilevered manner, and are disposed axially off or away from positions, which are demarcated by the noncircular inner peripheral cross-section of the major-diameter cylinder.

4. The boot set forth in claim 1, wherein:
   the noncircular inner peripheral cross-section of the major-diameter cylinder comprises a plurality of thick-walled portions and thin-walled portions which are disposed alternately; and
   the flanges extend axially outward from the thin-walled portions.

5. The boot set forth in claim 1, wherein:
   the flanges are disposed symmetrically with respect to an axial center of the major-diameter cylinder.

6. The boot set forth in claim 1, wherein:
   the positioning protrusions have a cross-sectional configuration which comprises an inclined surface tapering from wide to narrow in a direction of fitting the major-diameter cylinder around the mating member.

7. The boot set forth in claim 6, wherein the cross-sectional configuration of the positioning protrusions further comprises a surface which is disposed oppositely to the inclined surface so as to uprise from an inner peripheral surface of the major-diameter cylinder at about an acute angle.

8. The boot set forth in claim 1, wherein:
   a plurality of the sealing protrusion rims are formed on an inner peripheral surface of the major-diameter cylinder.

9. The boot set forth in claim 1, wherein:
   the major-diameter cylinder further comprises a groove for receiving the fastening member therein, the groove having a predetermined width; and
   the sealing protrusion rim is disposed within a positional range demarcated by the width of the groove.

10. A boot for a constant velocity joint boot, the boot comprising:
   a boot body comprising:
   a minor-diameter cylinder to be held to a shaft;
   a major-diameter cylinder separated away from the minor-diameter cylinder, disposed coaxially with the minor-diameter cylinder, and having a larger diameter than that of the minor-diameter cylinder; and
   a bellows connecting the minor-diameter cylinder with the major-diameter cylinder integrally, and formed as a truncated cone shape substantially; and
   an annular grommet formed of a softer material than that of the major-diameter cylinder, having an inner peripheral cross section formed as a noncircular shape and a sealing protrusion rim formed on an inner peripheral surface of the grommet, and to be fitted around a mating member after being fitted into the major-diameter cylinder of the boot body, the grommet and the major-diameter cylinder of the boot body to be fastened to the mating member by diametrically reducing a fastening member inward around an outer peripheral surface of the major-diameter cylinder of the boot body;

wherein the major-diameter cylinder of the boot body comprises:

a plurality of flanges disposed at intervals in a peripheral direction of the major-diameter cylinder, and extending axially outward from an opposite end surface of the major-diameter portion; and a positioning protrusion protruding from the flanges radially toward an inner peripheral side of the major-diameter cylinder, and to be engaged with a concavity formed in an outer peripheral surface of the mating member.

11. The boot set forth in claim 10, wherein:

the positioning protrusions are disposed adjacent to the opposite end surface of the major-diameter cylinder from which the flanges extend.

12. The boot set forth in claim 10, wherein:

the flanges are formed in a cantilevered manner, and are disposed axially off or away from positions, which are demarcated by the noncircular inner peripheral cross-section of the major-diameter cylinder.

13. The boot set forth in claim 10, wherein:

the major-diameter cylinder of the boot body further has a second sealing protrusion rim, which engages with an outer peripheral surface of the grommet, in an inner peripheral surface thereof.

14. The boot set forth in claim 10, wherein:

the noncircular inner peripheral cross-section of the grommet comprises a plurality of thick-walled portions and thin-walled portions which are disposed alternately; and the flanges extend axially outward from the thin-walled portions.

15. The boot set forth in claim 10, wherein:

the flanges are disposed symmetrically with respect to an axial center of the major-diameter cylinder of the boot body.

16. The boot set forth in claim 10, wherein:

the positioning protrusions have a cross-sectional configuration which comprises an inclined surface tapering from wide to narrow in a direction of fitting the major-diameter cylinder of the boot body around the mating member.

17. The boot set forth in claim 16, wherein the cross-sectional configuration of the positioning protrusions further comprises a surface which is disposed oppositely to the inclined surface so as to uprise from an inner peripheral surface of the major-diameter cylinder at about an acute angle.

18. The boot set forth in claim 10, wherein:

a plurality of the sealing protrusion rims are formed on an inner peripheral surface of the grommet.

19. The boot set forth in claim 10, wherein:

the major-diameter cylinder of the boot body further comprises a groove for receiving the fastening member therein, the groove having a predetermined width; and the sealing protrusion rim of the grommet is disposed within a positional range demarcated by the width of the groove.

* * * * *